United States Patent [19]

Nissel

[11] Patent Number: 4,533,510
[45] Date of Patent: Aug. 6, 1985

[54] METHOD AND APPARATUS FOR CONTINUOUSLY CO-EXTRUDING A SHEET

[76] Inventor: Frank R. Nissel, 8 Carey Dr., Ambler, Pa. 19002

[21] Appl. No.: 533,433

[22] Filed: Sep. 19, 1983

[51] Int. Cl.³ .............................................. B29F 3/04
[52] U.S. Cl. ...................................... 264/171; 264/37; 425/131.1; 425/133.5; 425/462
[58] Field of Search ............... 264/171, 37; 425/131.1, 425/133.5, 462

[56] References Cited

U.S. PATENT DOCUMENTS

| 3,398,431 | 8/1968 | Corbett | 425/133.5 |
| 3,471,898 | 10/1969 | Krystof | 425/131.1 |
| 3,583,032 | 6/1971 | Stafford | 425/133.5 |
| 3,761,211 | 9/1973 | Parkinson | 425/133.5 |
| 3,849,045 | 11/1974 | Ohkawa et al. | 425/131.1 |
| 3,909,170 | 9/1975 | Riboulet et al. | 425/133.5 |
| 4,152,387 | 5/1979 | Cloeren | 425/133.5 |
| 4,272,312 | 6/1981 | Thompson | 425/133.5 |
| 4,348,346 | 9/1982 | Thompson | 425/133.5 |
| 4,405,547 | 9/1983 | Koch et al. | 425/133.5 |
| 4,410,602 | 10/1983 | Komoda et al. | 264/37 |

FOREIGN PATENT DOCUMENTS

| 2853850 | 6/1980 | Fed. Rep. of Germany | 264/171 |
| 2851930 | 6/1980 | Fed. Rep. of Germany | 425/462 |
| 55-28825 | 2/1980 | Japan | 264/171 |
| 55-28887 | 2/1980 | Japan | 264/171 |

Primary Examiner—Jeffery Thurlow

[57] ABSTRACT

An apparatus and method for continuously producing a sheet composed of a plurality of materials co-extruded in segments along the width of the sheet are provided. The extrusion die has a slit extending along the width of the die, the slit being divided into a plurality of adjacent sections along the length of the slit. The widths of each of the segments are variable and can be accurately controlled. Feeding means for feeding material to each of the separate adjacent sections is provided. The method and apparatus are effective to produce a thermoplastic sheet having two or more layers in a central portion of the sheet and only a single layer at the edge portions of the sheet.

11 Claims, 6 Drawing Figures

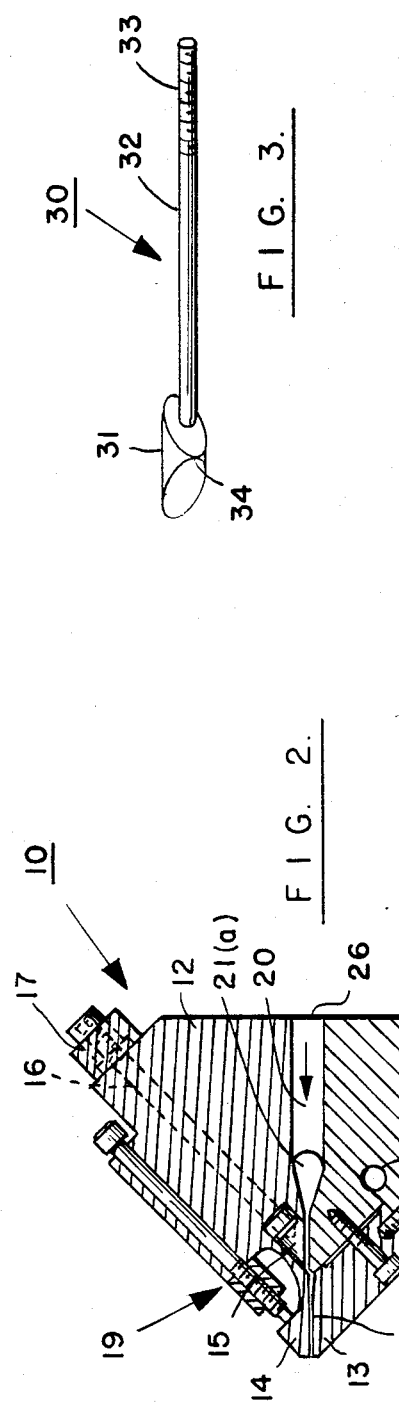
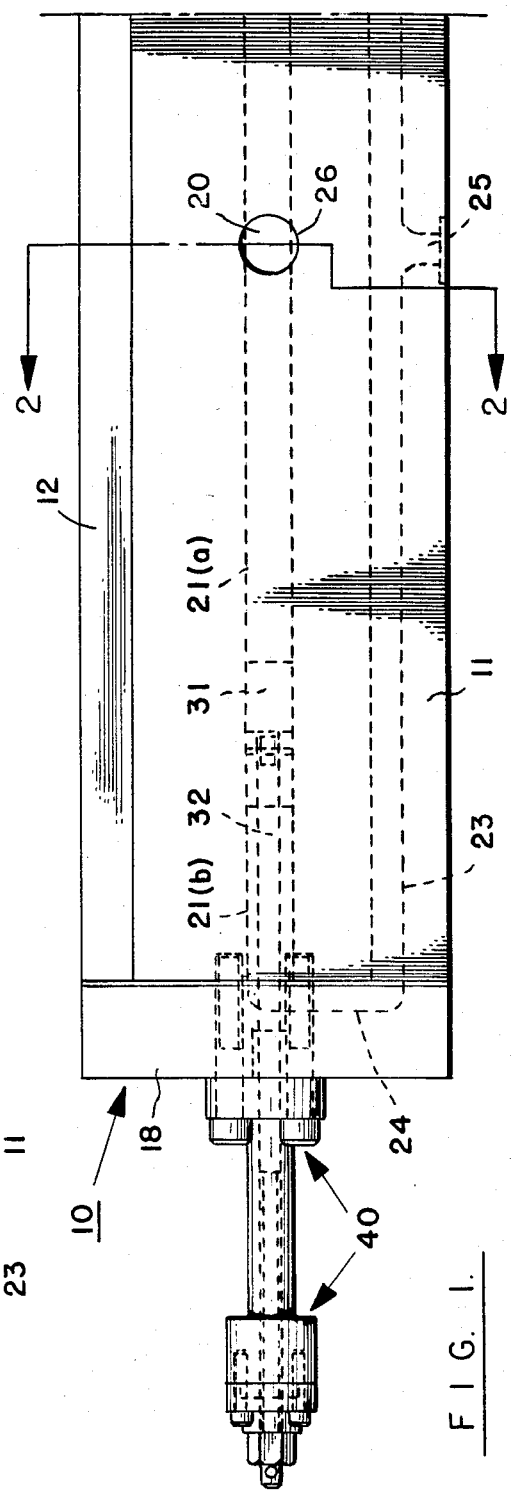

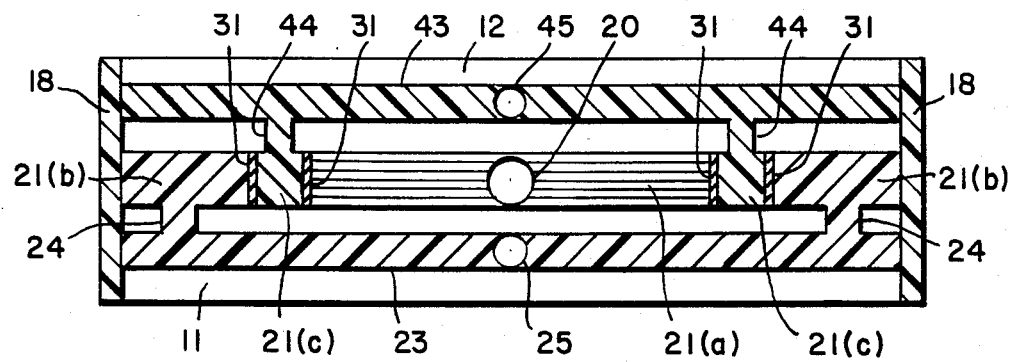
FIG. 4.
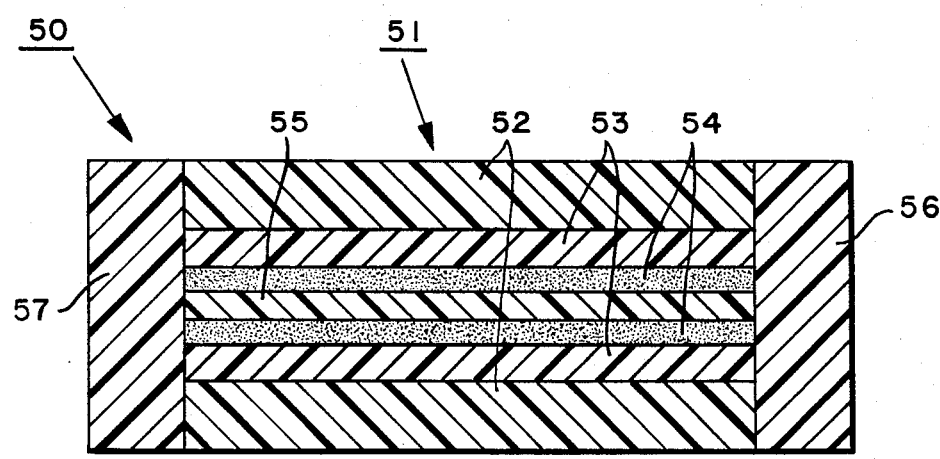
FIG. 5.
FIG. 6.

METHOD AND APPARATUS FOR CONTINUOUSLY CO-EXTRUDING A SHEET

BACKGROUND OF THE INVENTION

1. Field of the Invention

The field of the present invention generally relates to methods and apparatus for continuously producing a sheet composed of a plurality of materials co-extruded in segments along the width of the sheet.

More specifically, the present invention pertains to methods and apparatus for continuously producing a thermoplastic sheet composed of a plurality of thermoplastic materials coextruded in segments, wherein at least one of the segments comprises a multi-layered thermoplastic sheet, and at least one other segment comprises a layer of a single material.

2. Description of the Prior Art

It is known in the prior art to provide methods and apparatus for co-extruding a multi-layered sheet, such as a multi-layered thermoplastic sheet. See for example U.S. Pat. Nos. 3,833,704 and 3,918,865.

U.S. Pat. No. 3,398,431 to Corbett discloses a method and apparatus for producing a laminated extruded sheet utilizing a multi-manifold die. The central portion of the sheet contains several lamination layers while the edge portions comprise one or several laminated layers which extend across the entire width of the sheet. Corbett produces a multi-layered sheet having multiple layers of different polymers in the center portion of the sheet and only a single polymer at the edge portion of the sheet. The upper limit on the number of layers produced by the multi-manifold dies disclosed by Corbett is typically three or at most four.

U.S. Pat. No. 3,448,183 to Chisholm discloses a method and apparatus for producing a multi-layer film wherein one of the layers is found only in the central portion of the sheet and at least one layer extends across the entire width of the sheet such that the edges of the sheet are composed of a single material. This method and apparatus also utilizes a multi-manifold die which is limited to the production of a sheet material having three or at most four layers.

U.S. Pat. No. 3,397,428 to Donald discloses a method and apparatus for producing a multi-layered sheet having at least two components which are generally concentrically arranged. This concentric arrangement results in the encapsulation of one material by the other resulting in a sheet having a multi-layered construction in the central portion and a single material construction at the edges of the sheet.

U.S. Pat. No. 3,423,498 to Lefevre; U.S. Pat. No. 3,479,425 to Lefevre et al; U.S. Pat. No. 3,415,920 to Lee et al; U.S. Pat. Nos. 4,152,387 and 4,197,069 to Cloeren; and U.S. Pat. No. 3,477,099 to Lee et al disclose other methods and apparatus for the production of laminated films.

There has been a need in the art for an apparatus and method for making a multi-layered sheet material having multiple layers in the center portion of the sheet and a single material at the edges of the sheet, wherein the widths of the center and edge portions may be accurately controlled and varied.

Furthermore, there has been a need in the art for a method and apparatus for producing a laminated sheet having a central portion composed of multiple layers of different materials and at least one edge portion composed of a single material, different from any one of the materials used in the central portion of the sheet.

There has been a still further need in the art for a method and apparatus for producing a laminated sheet material having multiple layers in the central portion of the sheet and edge portions composed of a single material, wherein the multi-layered central portions of the sheet have two or more layers and preferably have more than four layers.

SUMMARY OF THE INVENTION

Thus, it is an object of the present invention to provide a method and apparatus for extruding a sheet composed of a plurality of materials co-extruded in segments along the width of the sheet.

It is a further important object of the present invention to provide such a method whereby the position of the seam between adjacent segments can be accurately varied and controlled.

It is another important object of the present invention to provide a method and apparatus for producing a sheet composed of a plurality of materials co-extruded in segments wherein at least one segment is composed of a single material and another segment is composed of a multi-layered sheet. By multi-layered sheet applicant means a sheet having at least one segment with two or more layers, for example two finish layers, two glue layers and an oxygen and water vapor barrier layer. It is a further important object of the present invention to provide such a method wherein the edge segments of the sheet are composed of a single material which can be trimmed and recycled.

It is a still further important object of the present invention to provide a method and apparatus for continuously producing a sheet composed of a plurality of materials co-extruded in a plurality of segments along the width of the sheet wherein the widths of the segments can be precisely controlled.

These and other objects of the present invention are met by an apparatus and method for continuously producing a sheet composed of a plurality of materials co-extruded in segments along the width of the sheet. The die has a passageway or slit extending along the width of the die, the slit being divided into a plurality of adjacent sections along the length of the slit. The widths of each of the segments are variable and can be accurately controlled. Feeding means for feeding materials to each of the separate adjacent sections is provided.

In a preferred embodiment of the invention, the die is provided with a lateral distribution manifold immediately upstream from the slit. Positioned within the manifold are one or more adjustable flow dividing blocks. The flow dividing blocks have a cross-section substantially the same as the cross-section of the manifold. Furthermore, the positions of the flow dividing blocks within the manifold are adjustable through the use of appropriate adjusting means.

In a still further preferred embodiment, the feeding means for at least one of the segments includes a feed block capable of producing a laminated sheet segment having two or more and preferably more than four layers.

Although the invention applies generally to the co-extrusion of thermoplastic materials, it shall be understood that the invention may also be used for making sheets composed of non-thermoplastic materials having the necessary flow properties for extrusion purposes.

BRIEF DESCRIPTION OF THE DRAWINGS

FIG. 1 is a back view shown partly in section of an extrusion die according to one embodiment of the present invention, with the optional choker bars removed for clarity.

FIG. 2 is a side sectional view taken along line 2-2 in FIG. 1, with the optional choker bars added.

FIG. 3 is a perspective view of the flow dividing block shown in FIG. 1.

FIG. 4 is a sectional view of an extrusion die according to another embodiment of the present invention, with the block positioning means removed for clarity.

FIG. 5 is a sectional view of an extruded sheet according to one embodiment of the present invention.

FIG. 6 is a sectional view of another extruded sheet according to another embodiment of the present invention.

Although specific forms of apparatus have been selected for illustration in the drawings, it shall be understood that a wide variety of equivalents may be substituted for those specific parts shown without departing from the spirit and scope of the invention which is defined in the appended claims.

DESCRIPTION OF THE PREFERRED EMBODIMENTS

Referring now to the figures, wherein like parts are labeled with the same number, the extrusion die is generally referred to as 10. Extrusion die 10 comprises a lower metal block 11 and an upper metal block 12. Secured to the lower block 11 is fixed lip 13. Movable lip 14 is controlled by lip adjusting means 19.

Referring to FIG. 2, an optional choker bar 15 is shown which is mounted upstream of the lips 13, 14 and which serves to equalize and distribute the pressure drop of the plastic material as it flows through passageway 20, manifold 21 and slit 22. A plurality of bolts 16 and nuts 17 are positioned on the upper block 12 along the width of the die in order to adjust the choker bar 15 along with width of the die.

Passageway 20, positioned between blocks 11, 12, is arranged to receive the flowable material which moves in the direction indicated by the arrow from a source such as an extruder outlet 26. A manifold 21 is positioned downstream from passageway 20 and enables the flowable material to spread sidewardly (while it is always moving longitudinally) to assume the width that is required for the desired sheet.

Positioned within lower block 11 is passageway 23 whose function will be described in more detail hereinafter.

Referring now to FIG. 1, the die 10 has end plates 18 (only one of which is shown) fixedly attached to the ends of the extrusion die 10. Each end plate 18 has a passageway 24 connecting passageway 23 with manifold 21.

As shown in FIGS. 1 and 3, the present invention includes a flow dividing means 30. The flow dividing means can be either adjustable or non-adjustable. Adjustable flow dividing means 30 includes a flow dividing block 31 and a rod 32 having a threaded end 33 attached thereto. The downstream side of block 31 is designated as 34.

As is clearly shown in FIG. 1, flow dividing block 31 is positioned within manifold 21, essentially dividing it into two parts 21(a) and (b). A block adjusting means 40 is provided enabling the flow dividing block 31 to be moved to the left or the right along the manifold 21. Means 40 is constructed according to known principles.

In the operation of the extrusion die 10 a recyclable plastic material is typically fed to inlet passageway 25 and through passageways 23, 24 to manifold 21(b). Examples of such a plastic material include, but are not limited to, a polyolefin or a styrenic polymer.

Simultaneously, according to one embodiment of the present invention, a multi-layered feed of plastic materials is fed from an extruder outlet 26 to passageway 20. Typical examples of such a multi-layered plastic feed include those used for making plastic sheets which are impervious to moisture and oxygen. One example of such a sheet comprises a top layer of polypropylene, a glue layer, a SARAN ™ layer, a second glue layer and a bottom layer comprised of polypropylene. Another example of such a plastic sheet includes a polypropylene top layer, a scrap material layer comprising a mixture of any number of plastic materials, a glue layer, an EVAL ™ layer, another glue layer, a second scrap layer and a bottom layer comprised of polystyrene. Of course, it is to be understood that these two examples are in no way limiting but are merely used to show the wide variety of multi-layered feeds which may be utilized with the present invention.

Such a multi-layered feed is fed to passageway 20 and further to manifold 21(a) where the multi-layered flowable material spreads sidewardly while it is also moving longitudinally to assume the width required for the multi-layered portion of the sheet. The width of the multi-layered portion of the sheet is determined by the position of the flow dividing blocks 31. Thus, in the embodiment illustrated in FIG. 1, the edge portions of the sheet would be composed of polypropylene while the center portion of the sheet (i.e. the portion between the flow dividing blocks 31) would comprise the multi-layered plastic sheet.

The shape of the block 31 is such that the flow of polypropylene contacts the flow of the multi-layered sheet material at the downstream point 34 just prior to entering the slit 22. It can be readily appreciated that with the embodiment illustrated in FIGS. 1 and 2, the width of the center and edge segments of the sheet are easily adjustable simply by adjusting the position of the flow dividing blocks 31.

Referring to FIG. 4 of the drawings, a schematic sectional view of an extrusion die according to another specific embodiment of the present invention is illustrated. The die comprises a lower block 11 and an upper block 12. The blocks 11, 12 have end plates 18 attached thereto. Running through the center of the die is manifold 21 which is divided into parts 21(a), 21(b), and 21(c), by flow dividing blocks 31. Inlet passageway 20 feeds a multi-layered material to manifold part 21(a). Inlet passageway 25 feeds a stream of, typically, recyclable thermoplastic material to passageway 23 which further feeds the material through passageways 24 into manifold parts 21(b) which later form the edge portions of the resulting extruded sheet. Inlet passageway 45 feeds a third material, which may be either a thermoplastic material or an adhesive for examples, into passageway 43 which further feeds the material into passageways 44 and into manifold parts 21(c). As can be seen, the extrusion die of FIG. 4 produces an extruded sheet having five segments; two edge segments comprising a thermoplastic material, two interior segments comprising either a thermoplastic material or an adhesive, and a central multilayered segment.

The cross section of a typical sheet 60 produced by the extrusion die shown in FIG. 4 is illustrated in FIG. 6. The dimensions of the sheet 60 have been altered for purposes of illustration. As can be seen, the edge portions 56, 57 comprise a single, typically recyclable, thermoplastic material. The interior segments 58, 59 comprise an adhesive. The central multilayered segment 51 is positioned between the adhesive segments 58, 59.

The cross section of another extruded sheet 50 is illustrated in FIG. 5. Extruded sheet 50 comprises a multi-layered segment 51 and edge segments 56, 57. The multi-layered segment 51 comprises virgin thermoplastic material layers 52, reground thermoplastic layers 53, adhesive layers 54 and a moisture and oxygen barrier layer 55. Layer 55 is composed of a material such as SARAN TM or EVAL TM for examples.

Although not specifically shown in the figures, it will be appreciated that any number of flow dividing blocks 31 may be positioned within the manifold 21 to divide the resultant sheet into any number of portions along the width of the sheet. Of course, with additional flow dividing blocks 31 forming additional parts 21 (c), (d), etc. additional passageways must be provided within blocks 11 and 12 to feed materials to those parts 21 (c), (d) etc.

It will be readily appreciated from the figures that the passageways in the extrusion dies illustrated are not limited to those specific embodiments shown in the drawings. For example, the passageways for feeding thermoplastic and adhesive materials to the manifolds may be positioned any number of ways to achieve the objects of the present invention. For example, the inlet passageways may be positioned in the upper and lower blocks 11, 12 as shown in the figures or may be positioned in the end plates 18. Furthermore, any number of passageways may be drilled in the blocks 11, 12 in order to form sheets having any number of segments along its width.

In addition to supplying plastic materials, it is also within the scope of the present invention to feed adhesive through one or more passageways in order to provide sheet segments composed entirely of adhesive in order, for example, to adhere an edge segment comprised of pure polypropylene or polystyrene to a multi-layered segment.

Although specific forms of apparatus have been selected for illustration in the drawings, it shall be understood that a wide variety of equivalents may be substituted for those specific parts shown without departing from the spirit and scope of the invention which is defined in the appended claims.

We claim:

1. A manifold sheet extrusion die for continuously producing a sheet composed of a plurality of materials coextruded in at least three segments, one such segment being a body segment and two other segments being edge segments, along the width of the sheet, comprising:
    a. a lateral distribution manifold positioned immediately upstream of an extrusion slit, the manifold and the slit extending along substantially the full width of the die;
    b. dividing means for dividing the manifold into at least three sections along the length of the manifold and for precisely controlling the width of a sheet segment, one such section being a body section and two other sections being edge sections, the dividing means being substantially infinitely adjustable along the length of the manifold;
    c. first feeding means for feeding a first material in a flowable state to an edge section; and
    d. second feeding means for feeding a second material in a flowable state to the body section.

2. The extrusion die as described in claim 1, wherein the dividing means (b) comprises one or more flow dividing blocks positioned within the manifold.

3. The extrusion die as described in claim 2, wherein the flow dividing blocks have substantially the same cross-section as the manifold.

4. The extrusion die as described in claim 3, wherein the flow dividing blocks are wedge-shaped.

5. The extrusion die as described in claim 1, wherein one of the feeding means comprises an apparatus for extruding a multi-layered sheet.

6. The extrusion die as described in claim 1, wherein the first feeding means comprises an apparatus for feeding a thermoplastic material capable of being trimmed from the extruded sheet and recycled by reheating and re-extruding.

7. The extrusion die as described in claim 1, including glue feeding means for feeding liquid glue to a section between two other sections to adhere two adjacent segments of the sheet.

8. A method for continuously producing a sheet composed of a plurality of materials coextruded in at least three segments, one such segment being a body segment and two other segments being edge segments, along the width of the sheet, comprising:
    a. dividing a lateral distribution manifold positioned immediately upstream of an extrusion slit, the manifold and the slit extending along substantially the full width of the die, into at least three sections, one such section being a body section and two other sections being edge sections, along the length of the manifold;
    b. feeding a first material in a flowable state to the body section;
    c. feeding a second material in a flowable state to the edge section; and
    d. precisely controlling the widths of the manifold sections with substantially infinitely adjustable flow dividing means positioned within the manifold in order to precisely control the widths of the extruded sheet segments.

9. The method as described in claim 8, wherein step (c) comprises feeding a multi-layered sheet material to the body section.

10. The method as described in claim 8, wherein step (b) comprises feeding to the first section a single thermoplastic material capable of being trimmed from the extruded sheet and recycled by reheating and re-extruding.

11. The method as described in claim 8, including feeding an adhesive to a section between two other sections and adhering two adjacent sheet segments.

* * * * *